Nov. 15, 1932.　　　W. W. WILLARD　　　1,888,099
CIRCUIT CONTROLLING APPARATUS
Filed May 10, 1930　　2 Sheets-Sheet 1
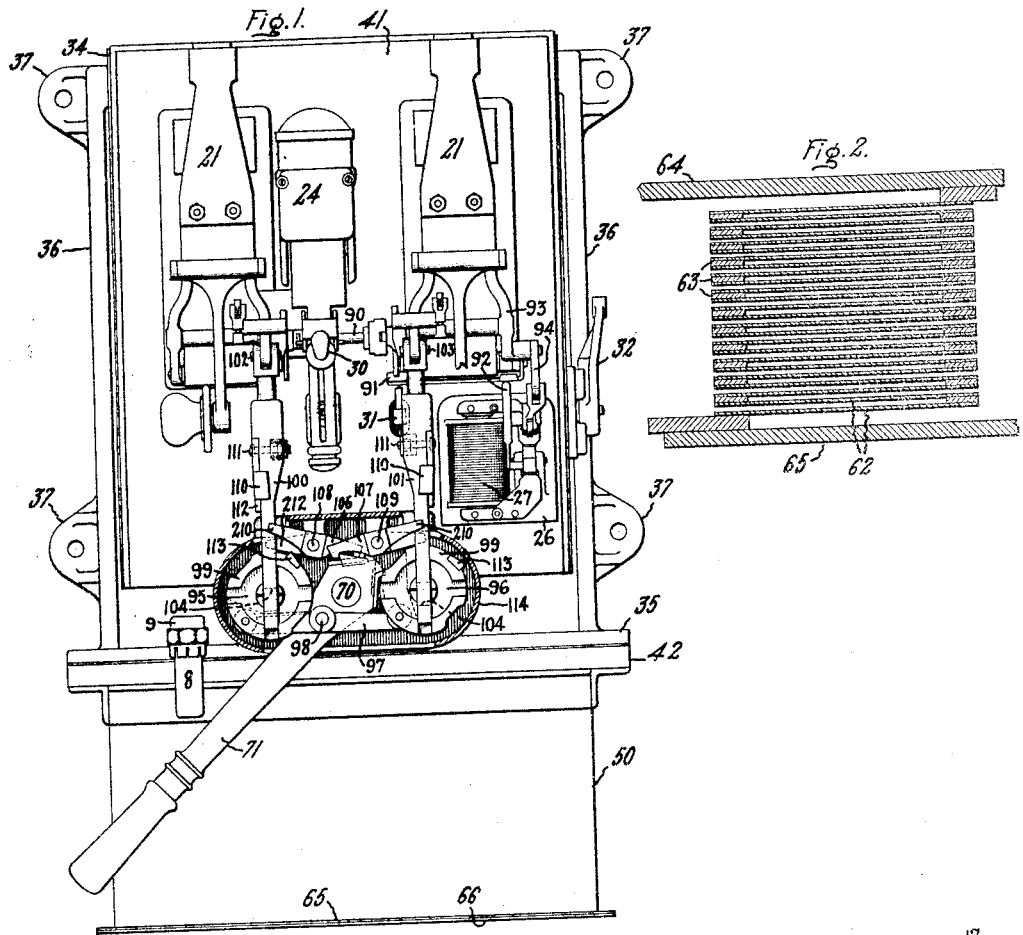
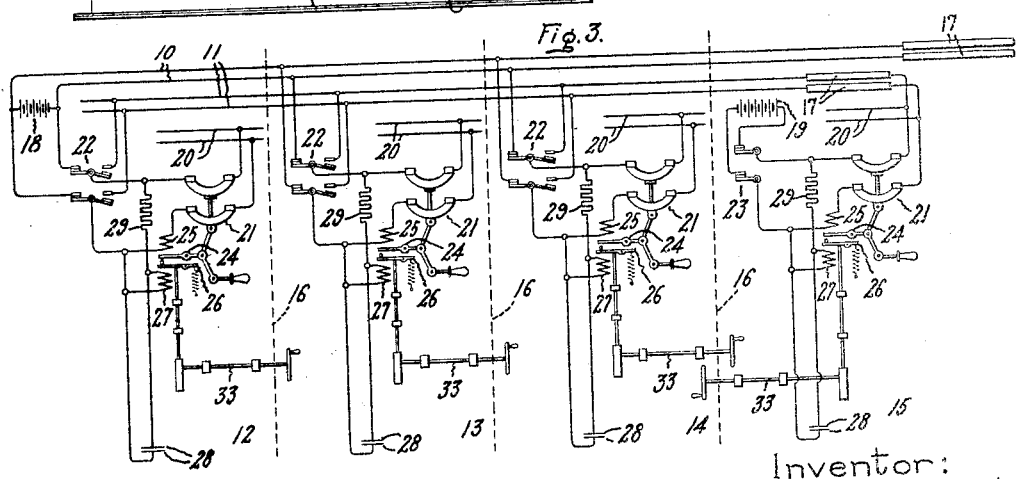
Inventor:
Waldo W. Willard,
by Charles N. Muller
His Attorney Nov. 15, 1932.  W. W. WILLARD  1,888,099
CIRCUIT CONTROLLING APPARATUS
Filed May 10, 1930  2 Sheets-Sheet 2
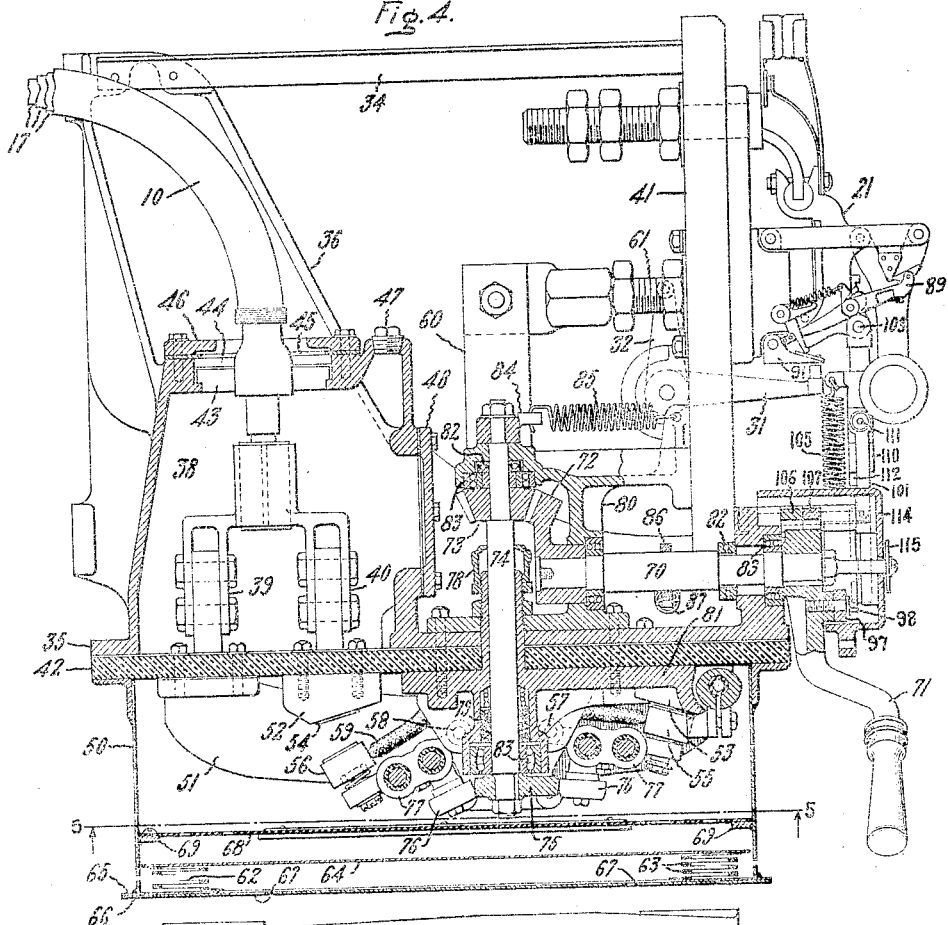
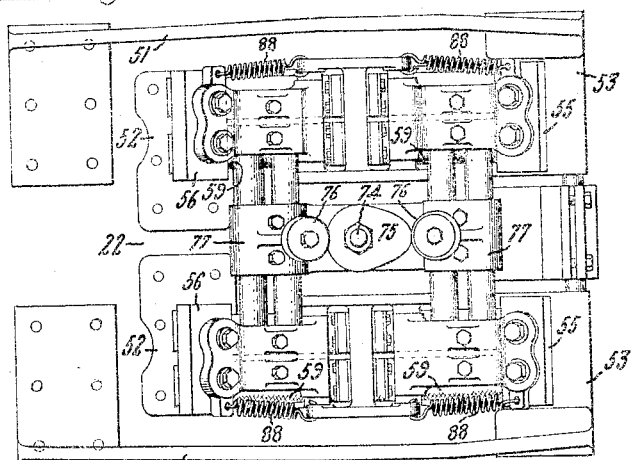
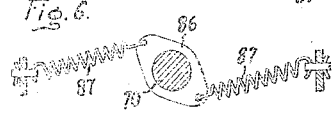
Inventor:
Waldo W. Willard,
by Charles V. Tullar
His Attorney Patented Nov. 15, 1932

1,888,099

UNITED STATES PATENT OFFICE

WALDO W. WILLARD, OF SCHENECTADY, NEW YORK, ASSIGNOR TO GENERAL ELECTRIC COMPANY, A CORPORATION OF NEW YORK

CIRCUIT CONTROLLING APPARATUS

Application filed May 10, 1930. Serial No. 451,448.

My invention relates to improvements in circuit controlling apparatus and more particularly to improvements in the control of electric circuits which are subject to flooding as for example on craft, such as submarines, which are adapted to be operated under water and are divided into a plurality of compartments which are arranged to be made water-tight.

The crews of submarines are exposed to great risks which are peculiar to these craft in times of peace as well as war. For example, when a submarine is running either wholly or partially submerged or even on the surface, collision with any object, such as other craft, submerged bodies or the like, may result in staving in the hull. Also, apart from collisions, variations in pressure due to submerging may strain the hull and open seams. Such conditions may cause the flooding of one or more compartments and frequently result in the loss of the submarine and its crew. This loss could often be either wholly or at least partially avoided if it were possible for the members of the crew in the undamaged compartments to carry on some of the normal functions of the craft. These functions are, in large measure, dependent on the application of electricity. If the flooding results in either a whole or partial crippling of the electric control and service, the functions are impaired accordingly and almost nothing can be done. For example, it has been customary in these craft to have one or more busses running the length of the craft and loads in the different compartments supplied from these busses. If a compartment is flooded the bus is practically short-circuited by the salt water in which these craft normally operate. Under such conditions things are quite obviously helpless and hopeless.

An object of my invention is to eliminate, in so far as humanly possible, dangers of this kind by the provision of a relatively simple apparatus which is substantially unaffected by pressure variations and quickly responds to abnormal conditions arising either in the circuit or the physical surroundings thereof whereby to prevent loss of control and to maintain the greatest service possible.

My invention will be better understood from the following description when considered in connection with the accompanying drawings and its scope will be pointed out in the appended claims.

In the accompanying drawings, Fig. 1 is a front elevation of circuit controlling apparatus embodying my invention; Fig. 2 shows in cross-section a detail of a pressure equalizing means adapted for use in practicing my invention; Fig. 3 illustrates diagrammatically a circuit controlling arrangement embodying my invention; Fig. 4 is a central longitudinal sectional elevation of the embodiment of my invention shown in Fig. 1; Fig. 5 is a view on the line 5—5 of Fig. 4 and Fig. 6 is a detail of a switch biasing mechanism.

Referring now to the drawings and particularly to Fig. 3, 10 and 11 represent two busses extending through the several compartments 12, 13, 14, 15 of a submarine, the compartments being formed as is well known to the art by water-tight bulkheads indicated schematically by the dotted lines 16. The busses 10, 11 are water-tight throughout their length and may be armored cables as indicated at 17 with water-tight connections to switching apparatus embodying my invention as will hereinafter appear. Associated with the busses 10 and 11 are suitable sources of electromotive force 18 and 19 respectively. These may be storage batteries which are preferably located in different compartments, for example, the fore and aft compartments of the submarine. Each of the several compartments may have its own load circuit 20.

In accordance with my invention, I provide means for so controlling the load circuit of a compartment that in case of flooding of the compartment by an electrically conducting liquid such as sea-water, the load circuit in the flooded compartment will be disconnected and the bus to which the load circuit was connected will be so isolated that service from that bus will not be impaired in the other compartments. As shown schematically in Fig. 3, the circuit controlling means includes suitable circuit interrupting means, such as a latched closed circuit breaker 21, a switch 22 which may be double-throw, and/or in certain cases a single-throw switch 23, and means for effecting the opening of the circuit breakers and switches in response to abnormal conditions arising in the associated load circuits or the physical surroundings thereof. As illustrated, the opening means includes an overcurrent tripping device 24 having a series trip coil 25, an undervoltage tripping device 26 having a shunt coil 27 and means responsive to the appearance of an electrically conducting liquid above a predetermined level in a compartment to trip the circuit breaker. The liquid level responsive tripping means, as shown, includes a plurality of spaced plates 28 of suitable electric current conducting material for example copper mounted in the compartment at the desired level and connected to the terminals of the shunt coil 27 of the undervoltage device. Thus, whenever sea-water submerges the plates 28, the shunt coil 27 is short-circuited and the circuit breaker tripped. A current limiting resistance 29 is provided to prevent excessive flow of current in the shunt coil 27 and in the circuit of the plates 28 when they are short-circuited by sea-water.

In order, particularly in case of the failure of the automatic tripping means, that the circuit breaker 21 may be tripped either by a person in the same compartment or in an adjacent compartment, manual tripping means are provided. As shown, these are respectively the tripping knob 30 and the tripping lever 31, with which is associated a crank 32 operable from an adjacent compartment by a rod 33. This rod is preferably rotatable in order to avoid any volumetric changes which would cause difficulty in operation in case of a pressure difference between the compartments and will, of course, pass through suitable water-tight means, examples of which are known to the art, in the bulkhead between the compartments. Where it is desired to isolate the source as, for example, the battery 19 to prevent its discharge in case of the flooding of its compartment, the single-throw disconnecting switch 23 may be connected between the battery and the circuit breaker as shown in compartment 15.

Inasmuch as space is an important item in underwater craft, I preferably provide, as shown in Figs. 1 and 4, a compact unitary mounting for the circuit breaker 21 and its associated disconnecting switch 22, together with their operating mechanisms. This mounting includes structural framework 34 secured to a base member 35 having side arms or brackets 36 which are provided with suitable mounting lugs 37. The base member may also include as an integral part thereof a terminal chamber 38 for the incoming bus cables 10, 11. This chamber has terminals for each of the cables although but two terminals 39, 40 appear in Fig. 4. The circuit breaker panel 41 is supported on the structural frame-work as shown. Between the terminals in the terminal chamber 38 and the circuit breaker 21, electrically speaking, is placed a disconnecting switch 22 which, physically speaking, is secured to the under side of the base member 35 below an intervening insulating base 42. The terminals 39, 40 are supported on this base.

The terminal chamber 38 may be made water-tight around the lead jackets of the bus cables by any suitable means indicated as a gasket 43, a lead filler 44, a gasket 45 and a clamp 46. For further security, the chamber 38 may also be filled with a suitable insulating compound through one or more holes which can be closed by pipe plugs 47. For accessibility in assembly the chamber may be provided with a removable cover 48.

In order that the bus or busses may be isolated by the double-pole, double-throw disconnecting switch 22, I provide therefor a water-tight casing 50 which is suitably secured to the insulating base 42 so as to insure a water-tight joint. In this casing are connections 51, 52 between the terminals 39, 40 and the fixed contacts 53, 54 of the switch 22, whose movable contacts 55, 56 are pivotally mounted at 57, 58 respectively. From these contacts extend flexible leads 59 to conducting straps 60, through a water-tight connection in the insulating base 42 and thence to the lower circuit breaker terminals 61. The flexible leads 59 from each pair of oppositely positioned contacts 55, 56 as viewed in Fig. 5 go to a common strap. I prefer to fill the casing 50 with suitable insulating liquid, such as oil, for two reasons. In case the automatic tripping means of the circuit breaker in a flooded compartment does not work and the circuit breaker is tripped by someone in an adjacent compartment, the opening of the circuit breaker in the flooded compartment effects the opening of its associated disconnecting switch 22 as will hereinafter appear. If the compartment is so flooded that the straps 60 or the lower circuit breaker terminals 61 are submerged when the circuit breaker opens, then the disconnecting switch, upon opening, must break the load or short-circuit produced by the salt water across these straps or terminals which lead to the movable contacts of the disconnecting switch. The flooding of a compartment with the submarine submerged at any great depth would subject the casing 50 to pressures which would necessitate a very strong and an excessively heavy structural design if the casing were not filled with a substantially incompressible liquid. The oil, therefore, enables a better circuit interruption in the extreme case to which the disconnecting switch 22 may be subjected and also prevents collapse of the casing under heavy external pressures. In order to insure that the casing 50 is filled with oil, I provide a filler plug 8 having a cap nut 9 and a vent, not shown, having a plug which is removable to permit pouring oil preferably at some predetermined temperature dependent on the desired working conditions through the filler plug. When the vent spills over the plug and cap nut are replaced.

The use of the oil, however, introduces a difficulty due to variations in the volume of oil with the extreme and rapid changes in temperature which may be experienced even under normal operating conditions of the submarine. These changes in volume tend to cause heavy stresses on the casing seams which may be welded as shown. In order to avoid these difficulties in pressure variations, I provide, in accordance with my invention, means for equalizing the pressures within and without the casing.

While any suitable pressure equalizing means may be employed, I have chosen one which requires relatively small space and which, as illustrated, is of the bellows type. As shown in Fig. 4, and more in detail in Fig. 2, this pressure equalizer includes a plurality of flexible metallic rings 62 whose shape may conform with that of the casing 50. Between these rings are secured alternately on the inside and outside adjacent edges, relatively narrow spacer rings 63 whose shape is similar to the shape of the flexible rings 62. This assembly is then suitably secured to an upper or floater plate 64 and to a lower ring 65 and a plate 66 provided with holes 67 through which fluids may pass from the hold of the craft to exert pressure on the floater plate. The bellows joints may be made by hydrogen brazing for example. The pressure equalizing means is suitably secured to the casing 50, for example by welding the ring 65 to the wall of the casing. The floater plate 64 is, of course, smaller than the casing 50 so that it may move freely thereon to change the volume thereof due to variations in the oil volume either from temperature changes or external pressure changes. In order to avoid fouling the live parts of the disconnecting switch 22 and to prevent any parts thereof, which may possibly become detached, from getting onto the floater plate 64, I may insert as indicated an intermediate plate 68 of suitably perforated insulating material. This plate may be secured to brackets 69 within the casing 50.

In order to insure operation of the disconnecting switch 22 independently of pressure conditions and with a minimum fixed effort, I preferably provide an operating mechanism which introduces no volumetric change during the switch operation. As shown, this mechanism includes an operating or drive shaft 70 to which is secured an operating lever 71 and to which is suitably coupled as by a segmental bevel gear 72 and a bevel pinion 73 a driven shaft 74. At the lower end of the shaft 74, I provide a cam 75 which engages rollers 76 on the movable contact carrying structures 77. This cam is so shaped that only one pair of movable contacts 55, 56 can be in circuit closing position at a time and so that both pairs may be open simultaneously. In order to insure watertight conditions where the shaft 74 passes through the casing 50, suitable stuffing boxes or glands 78 and 79 may be provided. The shafts 70 and 74 and the gears 72 and 73 respectively secured thereto are suitably journaled in the base 35, a supporting member 80 secured externally thereto and a supporting member 81 secured beneath and projecting through the insulating base 42. For this mounting and so as to reduce friction losses and properly distribute the loads, I may use thrust and roller bearings 82 and 83 respectively.

For effecting a circuit opening movement of the disconnecting switch operating mechanism, I provide suitable biasing means which, as shown, are of the over-center spring type. Thus, to the driven shaft 74 I may connect through a crank 84 secured thereto one end of a spring 85 which has its other end secured to the supporting member 80 and which tends always to turn the shaft 74 to the position in which both sides of the disconnecting switch are free to open. Similarly, on the operating shaft 70, I may mount a double crank 86 to which are connected springs 87 tending to pull the operating shaft into a position in which both sides of the disconnecting switch are free to open. Also in order to insure opening of the movable contacts 55, 56 after the cam 75 has been moved to the circuit opening position in case the contacts stick, I may provide suitable biasing means such as springs 88. These also help to accelerate the contact opening movement.

The circuit breaker 21 which operates in conjunction with the disconnecting switch 22 may be of any suitable type, examples of which are well known to the art, and so far as my present invention is concerned, it is necessary merely to consider the special features whereby the circuit breaker is correlated with the disconnecting switch mechanism and tripping control to secure the desired circuit controlling actions. As illustrated, the circuit breaker 21 embodies a latching mechanism 89 of the shock-proof type disclosed in United States Letters Patent 1,589,924, granted June 22, 1926 to the assignee of this invention on an application filed by W. A. Atwood. In order to insure the tripping of both poles simultaneously in response to overcurrent and under-voltage conditions, flooding and manual tripping, the tripping mechanisms may be interlocked through a shaft 90. As shown, the overcurrent tripping device 24 may operate directly on the shaft 90 while the other trips may operate on this shaft through a tripping bracket 91 which is in the path of movement of the manual tripping lever 31 and the tripping rod 92 of the under-voltage device 26. The under-voltage device is connected to the operating mechanism 93 of the right-hand pole of the circuit breaker, as viewed in Fig. 1, through a reset lever 94 so that the under-voltage device will be properly reset when the circuit breaker is closed.

In order to prevent either opening or closing the compartment load circuit 20 by means of the disconnecting switch 22, I provide an interlocking mechanism such that the disconnecting switch must be closed before the circuit breaker 21 is closed and opened after the circuit breaker is opened. As shown, this means may also be such that the opening of the circuit breaker 21, in effect, trips or causes the opening of the disconnecting switch 22 so as to isolate the bus 10 or the bus 11 from the compartment load circuit 20. As shown more clearly in Fig. 1, this interlocking mechanism includes two rotatably mounted cams 95, 96 inter-connected with each other and the operating shaft 70 for movement simultaneously therewith through a yoke lever 97 which is pivotally connected to the operating lever 71 at 98. The cams 95 and 96 have outwardly extending flanges 99 which, in the modification shown, are provided with four slots spaced substantially 90° apart to correspond with the total angular movement of the operating lever 71 from one closed position of the disconnecting switch to the other closed position. The pivotal connections of the yoke lever 97 to the cams 95 and 96 are in the modification shown substantially midway between the bottom and left-hand slots of the cams to correspond with the substantially 45° movement of the operating lever from either switch closed position to the middle or vertical position of the operating lever where neither of the disconnecting switch contacts 55, 56 is closed. Cooperating with the cams 95 and 96 so as to accord with the operation of the circuit breaker 21 are interlocking rods 100, 101 which are pivotally connected at 102 and 103 respectively to the operating mechanisms of the two circuit breaker brush carrying members so as to move simultaneously with the circuit breaker brushes. Each of these interlocking rods is provided with a slot 104 of sufficient size freely to admit the flange on the associated cam when the circuit breaker is open so that the disconnecting switch can be operated for closure in either position. While the interlocking rods 100, 101 are biased to interlocking position by the bias of the circuit breaker brushes, these rods may be further biased to the locking position by springs 105, see Fig. 4. These springs also tend to reduce rebounding upon the opening of the circuit breaker.

For holding the disconnecting switch 22 in each of its closed positions, the operating lever 71 may be provided with latching means such that the disconnecting switch cannot get started to cramp or hinder the full and free opening movement of both circuit breaker poles due to lack of synchronous movement of the two circuit breaker brushes which, although tripped substantially simultaneously, may not move exactly together. As shown, this latching means includes two pawls or latches 106 and 107 pivoted at 108 and 109 respectively. These latches may be mounted for movement in different parallel planes as shown. In each circuit closing position of the disconnecting switch 22, one of the latches hooks over a catch or lug and the other abuts another catch or lug on the operating lever 71, the latching positions being reversed in the two circuit closing positions of the disconnecting switch. Thus, in the circuit closing position shown in Fig. 1, the latch 106 abuts a lug at the rear of the operating lever while the latch 107 hooks over a lug at the front of the operating lever but in the other circuit closing position with the operating lever swung to the right substantially 90°, the latch 106 hooks over a lug at the rear of the operating lever and the latch 107 abuts a lug at the front of the operating lever. The latches 106 and 107 may be biased to latching position by suitable means such as springs which press against the rear tail 212 of the latch and which for the sake of clearness of the drawings, are not shown.

In order to release the latches 106 and 107 to effect the opening of the disconnecting switch 22 in response to the opening of the circuit breaker 21, the interlocking rods 100 and 101 are provided with tripping lugs 110 which engage the tails 210 of the latches in the downward movement of the rods. In order to move the lugs 110 clear of the latch tripping tails 210 to permit the latches to return to latching position under their bias so that the disconnecting switch 22 can be closed and latched before the circuit breaker 21 is closed, means are provided to move the lugs 110 out of the way. For this purpose, the lugs 110 may be flexibly mounted on the interlocking rods 100, 101 by spring-seated bolts 111 which permit the necessary movement of the lugs away from their associated rods. To accomplish this movement, the cams 95 and 96 may be provided with projections such as the inclined plane inserts or dogs 113 which, in the circuit opening movement of the disconnecting switch 22, engage the extensions 112 and move them sufficiently to permit the tails 210 of the latches to move clear of the tripping lugs 110 under the spring bias to which the latches are subjected. This action occurs in connection with both of the lugs 110 and the dogs 113 due to the oscillation of the operating lever 71 about the center or open position caused by the action of the springs 85 and 87.

The interlocking mechanism described may be enclosed in a suitable housing or cover 114. In order to indicate the position of the operating handle with respect to the contacts of the switch, the face of this housing may be marked as desired so that an indicating hand or pointer 115 mounted on an extension of the operating shaft 70 will tell the circuit controlling position of the disconnecting switch 22 with respect to whether the load circuit 20 is connected to the fore or aft batteries 18, 19.

From the foregoing description, it will be apparent that if the circuit breaker 21 is caused to open, for example due to an overcurrent condition on the load circuit 20, an undervoltage condition on the bus to which the load circuit is connected, flooding of the compartment or manual tripping operation, the disconnecting switch 22 will be unlocked and tripped so as to open. This opening of the disconnecting switch 22 always isolates the busses 10, 11 from the load circuit 20 so that if a compartment is flooded, the busses will not be short-circuited through the circuit breaker contacts which are adjacent the disconnecting switch fixed contacts. Due to the interlocking of the circuit breaker 21 and the disconnecting switch 22, an operator cannot use the disconnecting switch either to make or break the load circuit. Under normal operating conditions, the operating lever 71 can, of course, be actuated to shift the load circuit from one bus to another whenever desired, provided the circuit breaker 21 is first opened. The arrangement, therefore, provides a flexibility of operation which insures safety in operation under normal physical surroundings as well as under abnormal conditions.

While I have shown and described my invention in considerable detail, I do not desire to be limited to the exact arrangement shown but seek to cover in the appended claims all those modifications that fall within the true spirit and scope of my invention.

What I claim as new and desire to secure by Letters Patent of the United States is:

1. In combination with craft adapted to be operated under water and divided into compartments which are arranged to be made water-tight, a source of electromotive force in one of said compartments, a load circuit in one of said compartments, means for connecting said load circuit to said source including a switch, a liquid-filled water-tight casing for housing said switch, and means for equalizing the pressures within and without said casing.

2. In combination with craft adapted to be operated under water and divided into compartments which are arranged to be made water-tight, a circuit in one of said compartments, means for controlling said circuit including in said compartment a circuit breaker, a switch biased to circuit opening position, means for restraining said switch in circuit closing position, a liquid filled water-tight casing for housing said switch, means for equalizing the pressures within and without the casing, means for effecting the opening of the circuit breaker, and means controlled by the circuit breaker for effecting the opening of the switch in response to the opening of the circuit breaker.

3. In combination with craft adapted to be operated under water and divided into compartments which are arranged to be made water-tight and each of two of which contains a source of electromotive force, a load circuit in one of said compartments and means in said one of said compartments for connecting said load circuit to either of said sources including a circuit breaker, a double-throw switch mounted in a water-tight casing, said switch having a movable contact biased to circuit opening position, means for restraining said switch in each of its circuit closing positions, means for effecting the opening of said circuit breaker on the appearance of an electrically conducting liquid above a predetermined level in the compartment in which the circuit breaker is located, and means controlled by said circuit breaker for effecting the opening of said switch in response to the opening of the circuit breaker.

4. In combination with craft adapted to be operated under water and divided into compartments which are arranged to be made water-tight, two water-tight busses extending through a plurality of said compartments, a circuit in one of said compartments, and means in said one of said compartments for connecting said circuit to either of said busses including a circuit breaker, a double-throw switch mounted in a water-tight casing, means for equalizing the pressures within and without said casing, means for effecting the opening of said circuit breaker, and means controlled by said circuit breaker for effecting the opening of said switch upon the opening of the circuit breaker.

5. In combination with craft adapted to be operated under water and divided into compartments which are arranged to be made water-tight, a source of electromotive force in one of said compartments, a load circuit in another of said compartments, means for connecting said load circuit to said source including in said other compartment a circuit breaker, a switch having a movable contact biased to circuit opening position, means for restraining said switch in its circuit closing position, a liquid filled water-tight casing for housing said switch including means for equalizing the pressures within and without the casing, means for effecting the opening of a circuit breaker on the appearance of an electrically conducting liquid above a predetermined level in said other compartment, and means controlled by said circuit breaker for effecting the opening of said switch in response to the opening of the circuit breaker.

6. In combination with craft adapted to be operated under water and divided into compartments which are arranged to be made water-tight, a source of electromotive force in one of said compartments, a load circuit in one of said compartments, means for connecting said load circuit to said source including a circuit breaker, a switch mounted in a water-tight casing said switch having a movable contact biased to circuit opening position means for restraining said switch in its circuit closing position, means for effecting the opening of said circuit breaker on the appearance of an electrically conducting liquid above a predetermined level in the compartment in which the circuit breaker is located and means controlled by said circuit breaker for effecting the opening of the switch in response to the opening of the circuit breaker.

7. In combination with craft adapted to be operated under water and divided into compartments which are arranged to be made water-tight, a circuit in one of said compartments, means for controlling said circuit including a circuit breaker, a switch biased to circuit opening position means for restraining said switch in circuit closing position, means for effecting the opening of the circuit breaker on the occurrence of abnormal conditions and means controlled by the circuit breaker for effecting the opening of the switch in response to the opening of the circuit breaker.

In witness whereof, I have hereunto set my hand this 9th day of May, 1930.

WALDO W. WILLARD.